No. 804,369. PATENTED NOV. 14, 1905.
W. F. BEASLEY.
RESILIENT TIRE.
APPLICATION FILED MAR. 24, 1903. RENEWED APR. 14, 1905.

Witnesses
C. H. Walker

Inventor
William F. Beasley
By
Attorney

UNITED STATES PATENT OFFICE.

WILLIAM F. BEASLEY, OF PLYMOUTH, NORTH CAROLINA.

RESILIENT TIRE.

No. 804,369.   Specification of Letters Patent.   Patented Nov. 14, 1905.

Application filed March 24, 1903. Renewed April 14, 1905. Serial No. 255,655.

*To all whom it may concern:*

Be it known that I, WILLIAM F. BEASLEY, a citizen of the United States of America, and a resident of Plymouth, county of Washington, State of North Carolina, have invented certain new and useful Improvements in Resilient Tires, of which the following is a specification.

My invention relates to certain new and useful improvements in tires for vehicles the elasticity of which is provided for by the use of a resilient material, such as rubber or rubber composition.

A solid-rubber tire is deficient in elasticity, and the problem here sought to be solved is to so construct a tire that resiliency may be obtained without the necessity and expense of using the better grades of rubber and at the same time to provide a construction which insures the life of the rubber for the greatest length of time. It is, moreover, desirable that the resiliency of the tire be obtained by a part other than the part which receives the wear, as a perfect wearing-surface has requirements incompatible or at least difficult to secure simultaneously with perfect resiliency and that the resilient section be so constructed as to permit its removal from the wearing casing or section when it has lost its resiliency and its replacement by a new section. This is an obvious advantage. It is further desirable that the wearing-casing above specified may be readily removed from and replaced upon the wheel in order to permit the assemblage and reassemblage of the parts of the tire.

For the purpose above set forth my invention comprises a resilient core-section of rubber or rubber composition adapted to be inclosed in a wearing body-section, the core-section being formed with a series of truss-walls extending circumferentially around the wheel or longitudinally with the section, whereby pressure exerted on any point of the face of the core will be transmitted toward the sides thereof and be taken up by the body-section. The body-section is preferably given a convex tread-face, so that the major portion of the load will be transmitted to the central portion of the core to be taken up, as before described. If desired, the side displacement of the truss-walls may be limited by engaging portions on the core and tread sections.

My invention further consists in the construction, arrangement, and combination of the various parts of which it is composed, as will be hereinafter more fully described and claimed.

Figure 1:
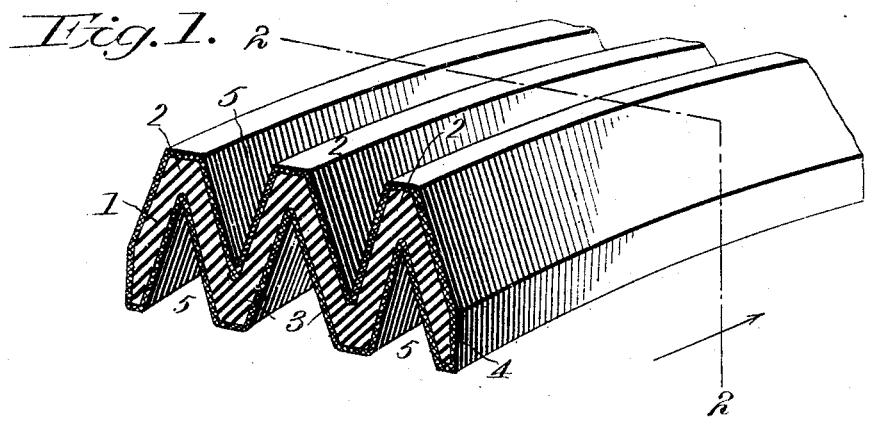
Figure 2:
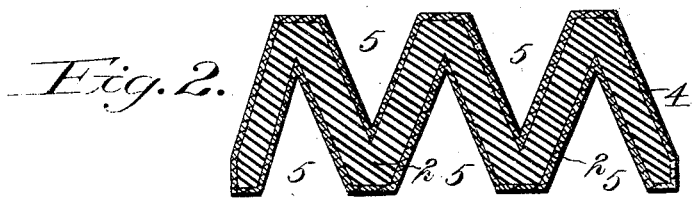
Figure 3:
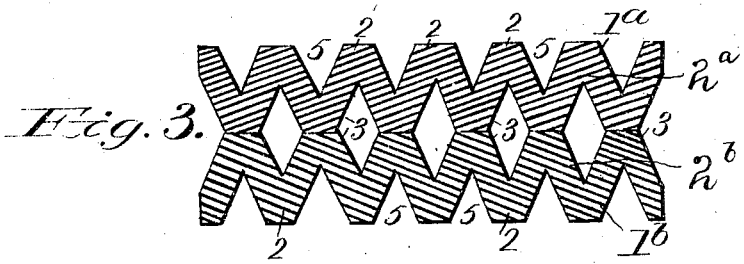
Figure 4:
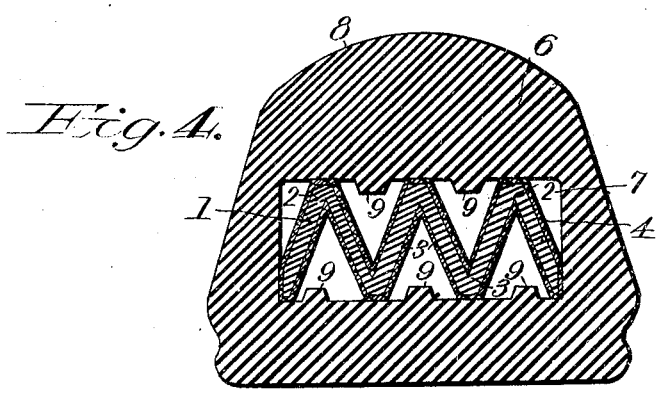

Referring to the accompanying drawings, in which corresponding parts are designated by similar marks of reference, Figure 1 is a perspective view of a fragment of a core-strip constructed in accordance with this invention. Fig. 2 is a transverse section on line 2 2 of Fig. 1. Fig. 3 is a view similar to Fig. 2, showing a modified form of core-section. Fig. 4 is a transverse section of a completed tire-core constructed in accordance with this invention.

The resilient or core section 1 may be formed either as a straight strip and afterward bent into annular form to fit the wheel or may be formed directly as a complete annulus or as an interrupted one. In any case it consists of one or more series of longitudinal truss-walls 2. The term "longitudinal" is here used to define a wall extending lengthwise of a core-strip or circumferentially of a core annulus and in contradistinction to "transverse" truss-walls—that is to say, to walls extending crosswise of the core.

In Figs. 1 and 2 I have shown a part of a core and a section therethrough, the trussed walls 3 consisting of a single series of longitudinal trussed walls, each end of each truss-wall abutting against the corresponding end of one of the adjacent truss-walls, while in Fig. 3 I have shown the core as formed with two series $2^a$ and $2^b$ of truss-walls intersecting each other at the center. Such a core may be formed by superimposing the one upon the other two cores $1^a$ and $1^b$, like that shown in Fig. 2, and securing the same together. This results in the formation of longitudinal apertures 3 of substantial rhombic cross-section in the middle part of the tire.

A core formed with longitudinal truss-walls, such as here described, may be strengthened by being wrapped on its outer and inner faces with a layer or layers 4 of suitable fabric (see Fig. 2) cemented thereon, the fabric following the sinuousities of the truss-walls and serving to prevent the tearing of the core upon excessive strain.

It will be seen that as above constructed the core is provided on its inner and outer surfaces with longitudinal grooves 5, formed by the apices of abutting truss-walls, these grooves being circumferential of the wheel when the tire is in place thereon.

The casing or wearing section 6 is a complete or incomplete annulus or strip having a central cavity 7 to receive the core-section 1, the latter being inserted therein, but not being cemented or vulcanized to the casing. The casing may be made in any manner which imparts sufficient strength to it, preferably consisting of canvas and rubber or rubber composition and of any approved cross-section, although I prefer to form it with a convex tread-face 8 in order that the greater part of the load may be directly transmitted to the middle portion of the core. I also prefer to form on the casing annular ribs or flanges 9, projecting into the central cavity 7 from the outer and inner walls thereof, which ribs enter the annular grooves 5 in the core and serve to limit the side movement of the trusses of the latter when under compression.

With a tire constructed as above described the weight of the vehicle resting on the tread face of the casing will cause a compression of the material thereof at the point in contact with the ground, and on account of the convex contour of the tread face thereof the greater part of the pressure resulting therefrom will be transmitted to the medial portion of the tread or outer face of the core. The truss-walls of the latter meeting at the point of pressure will receive it and in turn transmit it to the adjoining trusses meeting them at the rim or inner face of the core, which transmit the pressure in a like manner to their adjoining trusses which they meet at the tread face of the tire, and this will be continued by each truss-wall on opposite sides of the point of pressure. Thus the vertical pressure exerted by the weight of the vehicle on the core is by the truss-walls taken up by inclined walls and transmitted laterally, a part of the resilient pressure being resisted by friction on the casing at each apex formed by the truss-walls and the remainder being taken up by the casing at the sides of the central cavity. In case the pressure on the core should from overloading or any other cause become sufficient to endanger the core by distorting the trusses beyond their limit of elasticity or, in other words, be such as would, unless prevented, flatten out the core by crowding the truss-walls to the sides of the cavity the trusses will be spread, as before described, to a limited extent under the strain, after which the apices thereof will abut against the ribs 9 on the casing and become anchored against movement. Any further yielding of the tire must then be due to a deformation of the casing or a bending or compression of the truss-walls, or both combined. A tire having great resiliency under normal loads and great stiffness under excessive loads is thus provided.

Having thus described my invention, what I claim as new, and desire to secure by Letters Patent, is—

1. A resilient core for a tire, consisting of two separately-formed strips, each consisting of a series of trussed walls, the said strips being united at their inner faces whereby a core is formed having notches in its inner and outer surfaces and apertures in its center, substantially as described.

2. A resilient core for a tire, composed of a plurality of separately-formed strips, each of which consists of trussed walls, the two strips being assembled so that the apices of the trusses of one section register with the apices of the trusses of the other section, the said sections being united at the registering apices, whereby a core is formed having a plurality of series of intersecting trussed walls, substantially as described.

3. A resilient core for a tire, having longitudinal truss-walls forming a series of longitudinal flanges and channels on the inner and outer faces of the core, substantially as described.

4. A resilient core for a tire having a plurality of intersecting series of longitudinal truss-walls, substantially as described.

5. A resilient core for a tire, having a plurality of intersecting series of longitudinal truss-walls, forming a series of longitudinal channels on the inner and outer faces of the core, and a series of apertures in the central portion thereof, substantially as described.

6. A resilient core for a tire, having a series of longitudinal truss-walls and textile layers on the outer and inner faces of the core, following the sinuosities thereof, substantially as described.

7. A tire consisting of a resilient core having a series of longitudinal truss-walls and a casing therefor, provided with a central cavity in which the core is contained and in which it has a limited movement from side to side, substantially as described.

8. A tire consisting of a resilient core, having a series of longitudinal truss-walls, and a casing therefor, provided with a central cavity in which the core is movably contained, the casing having longitudinal ribs projecting into the central cavity, and limiting the movement of the core.

9. A tire consisting of a resilient core, having a series of longitudinal truss-walls, and a casing therefor, provided with a convex tread-face and a central cavity in which the core is movably contained, the casing having longitudinal ribs projecting into the central cavity, and limiting the movement of the core, substantially as described.

Signed at Washington, District of Columbia, this 14th day of March, 1903.

WILLIAM F. BEASLEY.

Witnesses:
 JOHN L. FLETCHER,
 G. T. HUGHES.